US012764847B2

(12) United States Patent
Kumar M B et al.

(10) Patent No.: US 12,764,847 B2
(45) Date of Patent: Oct. 13, 2026

(54) ENERGY DEVICE CONTROL APPARATUS AND METHOD

(71) Applicant: Digitectura Technologies Pvt. Ltd., Bengaluru (IN)

(72) Inventors: Harish Kumar M B, Jakkur (IN); Siddanth Satish, Bangalore (IN)

(73) Assignee: Digitectura Technologies Pvt. Ltd., Bengaluru (IN)

( * ) Notice: Subject to any disclaimer, the term of this patent is extended or adjusted under 35 U.S.C. 154(b) by 0 days.

(21) Appl. No.: 18/795,171

(22) Filed: Aug. 5, 2024

(65) Prior Publication Data

US 2026/0040422 A1 Feb. 5, 2026

(51) Int. Cl.

| | |
|---|---|
| ***H05B 47/18*** | (2020.01) |
| ***F24F 11/56*** | (2018.01) |
| ***F24F 11/63*** | (2018.01) |
| ***F24F 110/10*** | (2018.01) |
| ***F24F 110/20*** | (2018.01) |
| ***H05B 47/11*** | (2020.01) |
| ***H05B 47/13*** | (2020.01) |

(52) U.S. Cl.

CPC ............ *H05B 47/183* (2024.01); *F24F 11/56* (2018.01); *F24F 11/63* (2018.01); *H05B 47/11* (2020.01); *H05B 47/13* (2020.01); *F24F 2110/10* (2018.01); *F24F 2110/20* (2018.01)

(58) Field of Classification Search

None

See application file for complete search history.

(56) References Cited

U.S. PATENT DOCUMENTS

| | | | | |
|---|---|---|---|---|
| 6,486,778 | B2 * | 11/2002 | Mahler | G08B 13/19697 340/567 |
| 9,488,355 | B2 | 11/2016 | Igaki et al. | |
| 10,206,259 | B2 | 2/2019 | Burmeister et al. | |
| 10,819,824 | B2 | 10/2020 | Lebel et al. | |
| 11,406,001 | B2 * | 8/2022 | Aggarwal | H05B 47/175 |
| 2014/0266669 | A1 * | 9/2014 | Fadell | G08B 19/00 340/501 |
| 2014/0362669 | A1 * | 12/2014 | Mohan | H05B 47/115 250/208.2 |
| 2017/0238387 | A1 * | 8/2017 | Dahlen | H05B 39/042 315/130 |

(Continued)

FOREIGN PATENT DOCUMENTS

| | | | |
|---|---|---|---|
| CN | 205213123 | U | 5/2016 |
| CN | 210579398 | U | 5/2020 |

(Continued)

OTHER PUBLICATIONS

Pandharipande Ashish and Shuai Li , Light-Harvesting Wireless Sensors for Indoor Lighting Control, vol. 13 9 pgs. Dec. 2013 (retrieved Jul. 23, 2024).

(Continued)

*Primary Examiner* — Kenneth B Wells

(74) *Attorney, Agent, or Firm* — Brett A. Schenck

(57) ABSTRACT

An energy device control apparatus for controlling lighting, HVAC or other energy devices of a particular area of a building is provided. The apparatus includes a presence sensor, a passive infrared sensor, a microprocessor, and a controller to control the energy device by detecting human occupancy in the area of the building.

18 Claims, 5 Drawing Sheets

(56) References Cited

U.S. PATENT DOCUMENTS

| | | | | |
|---|---|---|---|---|
| 2017/0309038 | A1* | 10/2017 | Dorster | H05B 47/13 |
| 2017/0347421 | A1 | 11/2017 | Picco | |
| 2018/0188018 | A1* | 7/2018 | Brown | H05B 47/115 |
| 2018/0220506 | A1 | 8/2018 | Sadwick | |
| 2020/0187338 | A1* | 6/2020 | Pandharipande | G01J 1/0228 |
| 2020/0229285 | A1* | 7/2020 | Pandharipande | H05B 47/115 |
| 2021/0080325 | A1 | 3/2021 | Kunzli et al. | |
| 2022/0128728 | A1* | 4/2022 | Golwala | G01H 1/00 |
| 2023/0105512 | A1 | 4/2023 | Takada et al. | |
| 2023/0194115 | A1* | 6/2023 | Malik | F24F 11/63<br>700/276 |
| 2025/0123528 | A1* | 4/2025 | Rasmus-Vorrath | G02F 1/163 |

FOREIGN PATENT DOCUMENTS

| | | | |
|---|---|---|---|
| JP | 2000286063 | A | 10/2000 |
| JP | 2015102270 | A | 6/2015 |
| JP | 2016142415 | A | 8/2016 |
| JP | 2017126365 | A | 7/2017 |
| KR | 101846495 | B1 | 4/2018 |
| KR | 20180052917 | A | 5/2018 |
| KR | 20190018191 | A | 2/2019 |
| WO | WO2014134637 | A2 | 9/2014 |
| WO | WO2022010913 | A1 | 1/2022 |

OTHER PUBLICATIONS

Chew Ivan, Vineetha Kalavally, Naing Win Oo, and Jussi Parkkinen, Design of an energy-saving controller for an intelligent LED lighting system, vol. 120, p. 7, May 15, 2016, (retrieved Jul. 23, 2024).

Chew Ivan, Vineetha Kalavally, Chee Pin Tan, and Jussi Parkkinen, A Spectrally Tunable Smart LED Lighting System With Closed-Loop Control, p. 9, May 2016 (retrieved Jul. 23, 2024).

* cited by examiner

ENERGY DEVICE CONTROL APPARATUS AND METHOD

FIELD OF THE INVENTION

This application relates to an energy device control apparatus and method. In particular, this application relates to controlling lighting, Heating, Ventilation, and Air Conditioning (HVAC) or other energy devices or non-energy devices by detecting human presence in the room or other area using a combination of three technologies.

BACKGROUND OF THE INVENTION

Existing light, HVAC or other energy devices may be controlled by measuring the condition (e.g. temperature, light intensity etc.) in the room using sensors, determining the occupancy of the room using motion sensors, or determining the occupancy rate using cameras. Each of these technologies has challenges associated with reliability and costs.

For example, a lighting system may be controlled based on a passive infrared (PIR) sensor, where the PIR sensor is used to detect large human movements. However, in an office environment, when a person is working in an ideal condition, the movement is very minimal and thus difficult to detect by the PIR sensor. Hence, the PIR sensor assumes that the user left the office environment and as a result, the lighting system turns off automatically even when the person is still in the office. In such a scenario, the person working in the office environment is affected by the sudden loss of light. It is then required for the person to make a large movement for the light to switch back on.

In another example, a CMOS/RF/LiDAR (Light Detection and Ranging) system may be used to control a lighting system. The CMOS/RF/LiDAR is a remote sensing method that uses light in the form of a pulsed laser to measure ranges (variable distances) to the Earth system. The data are captured at fixed intervals and processed to check for the presence. As the data is processed at a fixed interval there is a delay in the control system. The processing of the data is time consuming with high power requirements for processing of the data which involves AI and ML/complex algorithms to do. With the limited technologies and dependency on environmental variables like lighting conditions, distance from the sensor, and obstacles, the algorithm error rate is high.

In another example, an ambient light sensor may be utilized to control a lighting system, but it may have an adverse effect on the performance. The resulting dimly lit area leads to fatigue leading to less productivity.

Energy device control apparatuses and methods may benefit from improvements.

SUMMARY OF THE INVENTION

In one aspect of the present invention, an apparatus for controlling one or more devices for an area of a building is provided. The apparatus includes a presence sensor, a passive infrared sensor, a microprocessor, and a controller. The presence sensor is operative to sense the presence of one or more persons in the area. The passive infrared sensor is operative to detect motion of the one or more persons in the area. The passive infrared sensor is operative to send the motion information to the microprocessor. The presence sensor is operative to send information about the presence of the one or more persons in the area to the microprocessor.

The microprocessor is operative to determine the number of persons in the area based on the information about the presence of the one or more persons in the area from the presence sensor and the motion information from the passive infrared sensor. The microprocessor is operative to send the information on the number of persons in the area determined by the microprocessor to the controller. The controller is operative to send control commands to a control system to control the one or more devices based on the information on the number of persons in the area received from the microprocessor. The presence sensor is operative to continuously operate to sense the presence of the one or more persons in the area regardless of whether the passive infrared sensor detects motion of one or more person in the area.

Other aspects of the disclosed invention will become apparent from the following detailed description, the accompanying drawings, and the appended claims.

DETAILED DESCRIPTION OF THE INVENTION

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Figure 2:
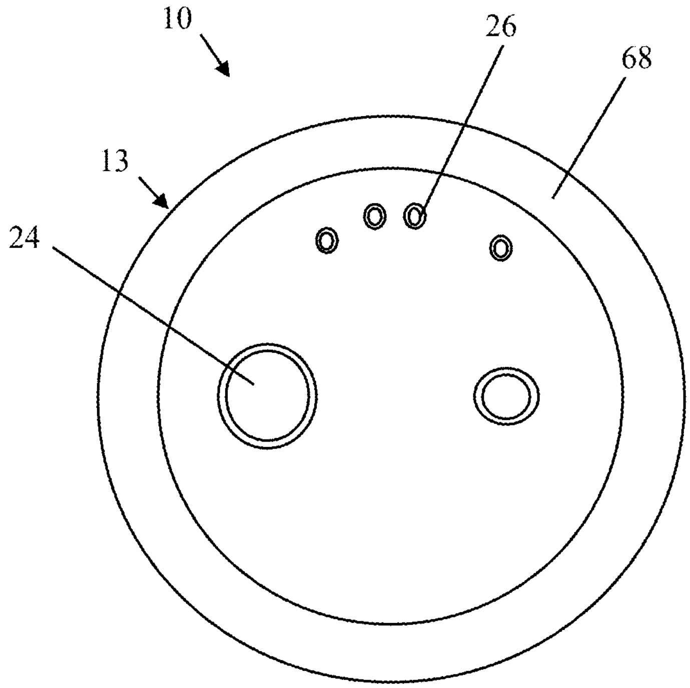
FIG. 2 is a top view of the stand-alone unit of the energy control apparatus of FIG. 1.

Throughout the present description, the terms “upper”, “lower”, “top”, “bottom”, “left”, “right”, “front”, “forward”, “rear”, and “rearward” shall define directions or orientations with respect to the energy control apparatus as illustrated in FIG. 2. It will be understood that the spatially relative terms “upper”, “lower”, “top”, “bottom”, “left”, “right”, “front”, "forward", "rear", and "rearward" are intended to encompass different orientations of the apparatus in use or operation in addition to the orientation depicted in the figures. For example, if the apparatus in the figures is turned over, elements described as "upper" elements or features would then be "lower" elements or features.

The present invention utilizes a combination of two or three technologies to solve the problem with much less cost, more reliability and enhanced privacy. These technologies include an energy control apparatus having a resident sensor, which is a confirmation based light control with integrated PIR and presence detection sensors. The PIR sensor detects motions, either slight or large based on the distance of the human from the sensor. Further away from the PIR sensor would require a large motion for the PIR sensor to register the presence. The presence detection sensor uses CMOS/RF/LiDAR based technologies to capture the image of the area and processes it to detect the presence of a human. An Integrated Lighting Control system for DALI or Analog or KNX or TRIAC or MOSFET or On/OFF that provides a cost effective and quick response to the user needs may also be provided. An Integrated control system for HVAC using open protocols with MODBUS RTU or MODBUS IP or BACnet mstp or BACnet IP will provide the resident sensor an ability to control the connected HVAC system based on occupancy.

The resident sensor has the following data lakes connected to its microprocessor 20 providing it a way to make more Intelligent decisions. One data lake includes room booking information, which enables the integrated control system to authenticate room occupancy or release the booking on the no show(s) that indicate that the room is not occupied. Another data lake includes external temperature and humidity information, which enables the integrated control system to adjust the temperature setpoints based on number of occupants and external temperature & humidity for better comfort and energy savings. Another data lake includes operator schedules and overrides. Another data lake includes a timing threshold, which enables the resident sensor to send out an alarm if a human presence is detected beyond the set time threshold.

The PIR is a low power device, operatable for years using battery with the battery life of 8+ years, whereas the CMOS or Radar or Lidar is a high power device which cannot be operated on a battery source due to the power requirements. The CMOS/RF/LiDAR S sensor is either used for space monitoring or control of Lighting systems. PIR based sensors are used predominantly for Lighting system controls, but can be used for other control systems. Combining the technologies to creates a unique architecture of the product for power saving in the lighting system and HVAC Control providing with the additional integration of Ambient Light Sensor and Temperature and Humidity sensor provides a better experience to the user.

It is also able to do various predictive analytics for energy management, maintenance, cleaning schedules and facility cost optimization using cloud computing and machine learning. The present invention utilizes a radar system to detect the presence of humans along with the distance with high accuracy. Integration of space mapping with lighting control and HVAC control from a single system provides an enhanced user experience with a quick response of the actions.

Figure 1:
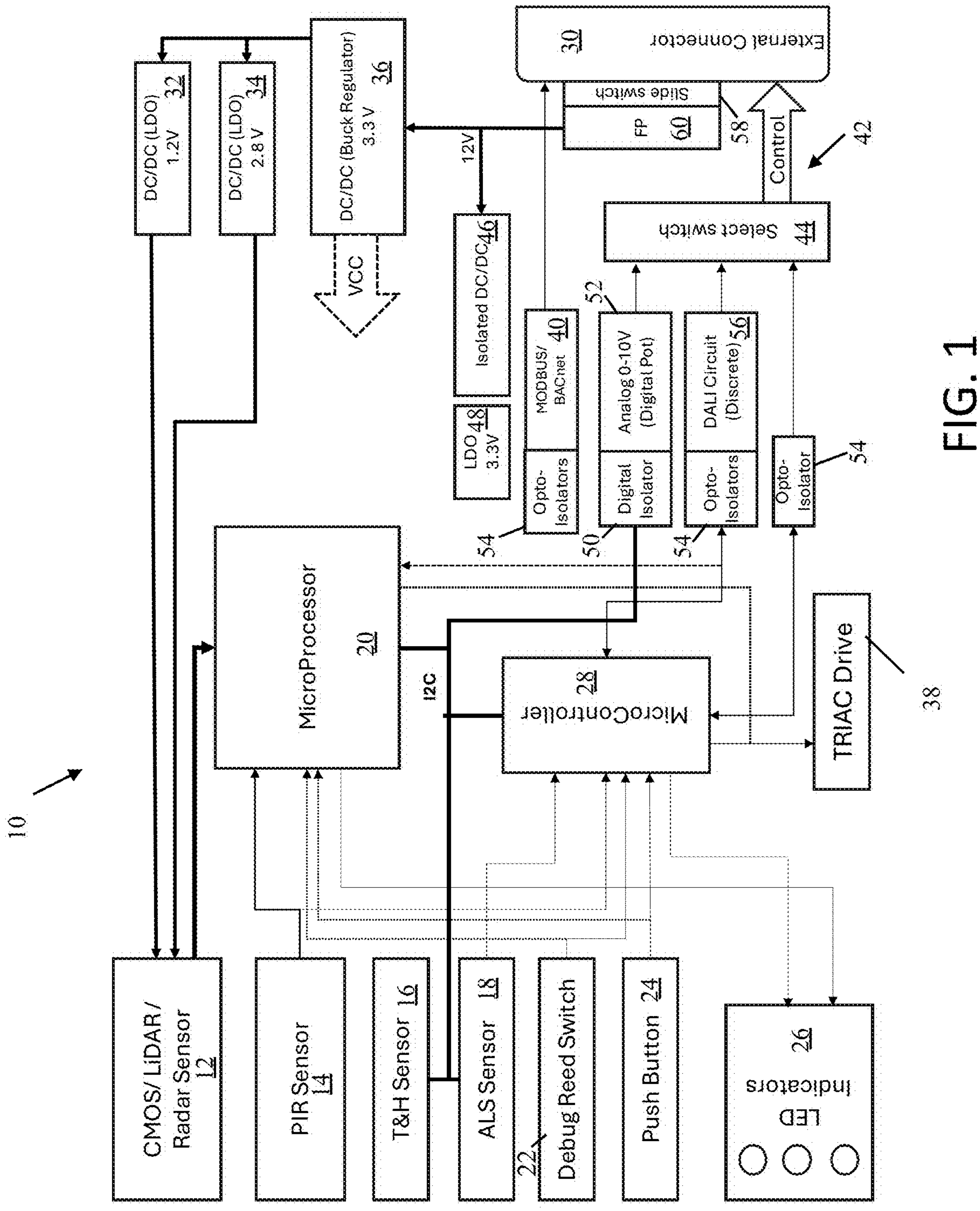
FIG. 1 is a schematic block diagram of an energy control apparatus according to an embodiment of the present invention.
Figure 6:
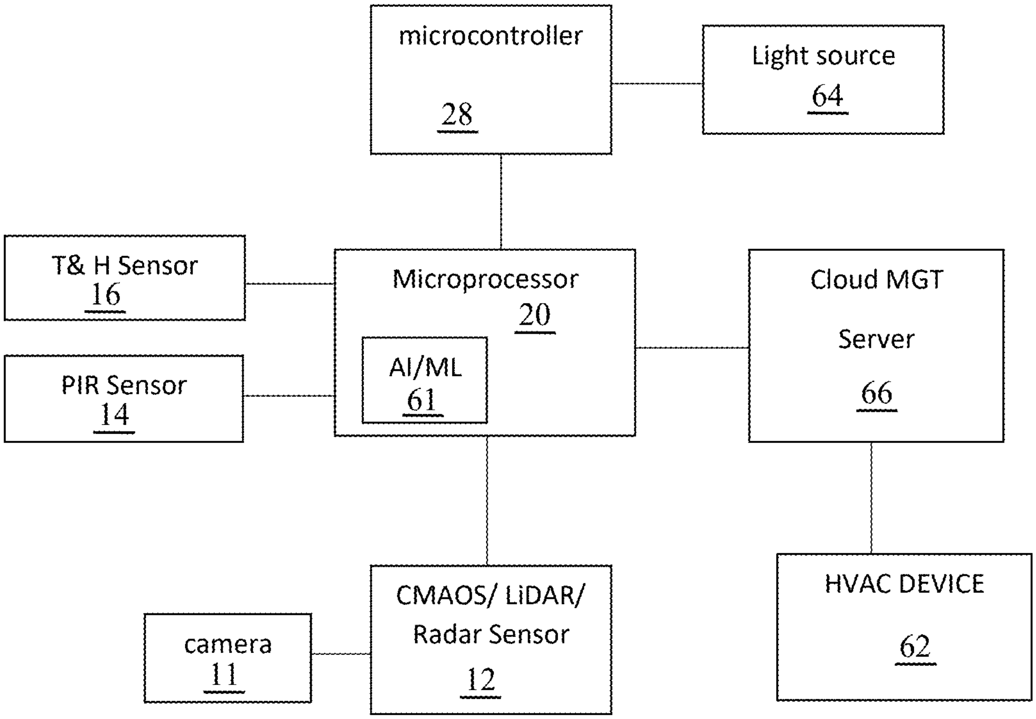
FIG. 6 is a schematic block diagram of a portion of the apparatus of FIG. 1 and related devices.

FIG. 1 shows an energy control apparatus 10 according to one embodiment of the present invention. The apparatus 10 comprises a presence sensor in the form of a CMOS/LiDAR radar sensor 12, which uses light in the form of a pulsed laser to measure ranges (variable distances) to the Earth system. The CMOS/LiDAR radar sensor 12 may be integrated with a camera 11 (FIG. 6). The apparatus 10 further comprises a passive infrared (PIR) sensor 14, a temperature and humidity sensor 16, an ambient light sensor (ALS) 18, microprocessor 20, a debug reed switch 22, a push button 24, Light emitting diode (LED) indicators 26, and a controller in the form of a microcontroller 28. The apparatus 10 further includes an external connector 30, a 1.2 volt DC/DC low-dropout regulator (LDO regulator) 32, a 2.8 volt DC/DC low-dropout regulator (LDO regulator) 34, a 3.3 volt DC/DC (Buck Regulator) 36, TRIAC Drive 38, Modbus and/or BACnet interface 40, and a control system 42. The TRIAC Dimmable Driver 38 is an electrical device that provides dimming control for LED lighting. The CMOS/LIDR/Radar sensor 12 measures the human presence in the area. The PIR sensor 14 measures the human motion in the area. The temperature humidity sensor 16 measures the temperature and humidity in the area. The ambient light sensor 18 measures the light intensity in the area.

The control system 42 includes a select switch 44, an isolated DC/DC 46, a 3.3 volt LDA DC/DC low-dropout regulator (LDO regulator) 48, a digital isolator 50, an analog 0-10 digital potentiometer 52, optical isolators 54, and a DALI (Digital Addressable Lighting Interface) discrete circuit 56. The DALI circuit 56 comprises a 2-way communications protocol that is used to provide control over, and communication between, the components in a lighting system. For example, the protocol is designed to allow various lighting devices, such as ballasts, sensors, switches, and other control equipment, to communicate with each other over a single two-wire bus.

The DALI circuit 56 includes DALI-compatible devices, including dimmable and non-dimmable lighting fixtures, sensors, switches, and control interfaces. The DALI system uses a two-wire cable to connect all devices within the DALI circuit 56. This cable carries both communication signals and, in some cases, power to certain devices. The DALI circuit 56 allows individual control of lighting devices. Each device can be assigned an address, enabling specific control over individual lights or groups of lights. The DALI circuit supports flexible topology.

The Modbus and/or BACnet interface 40 is an open protocol communication interface used in building control systems. This protocol provides control over, and communication between, the components in the HVAC system. The protocol includes software running inside the microcontroller 28. The protocol uses a couple of the IO pins of the microcontroller 28 for BACnet MSTP and ethernet interface for BACnet IP. The CMOS/RF/LiDAR is also connected to the microcontroller 28 on the specific IO pins.

The microcontroller 28 is electrically connected to the microprocessor 20 using 12C interface. The microcontroller 28 is also electrically connected to the temperature and humidity sensor 16, and the Ambient light sensor 18. The debug reed switch, push button, and LED indicators are electrically connected to the microcontroller 28. The control system 42 is connected to the microcontroller 28. The external connector 30 is electrically connected to a power source. An on/off slide switch 58 and filter protection circuit 60 are coupled to the external connector 30. When the slide switch 58 is slid to the on position, power from the power source travels through the filter protection circuit 60 resulting in a 12 volt output. This 12 voltage output is then inputted into the Buck Regulator 36 and also the control system 42. The output of the Buck regulator 36 is inputted into the 1.2 volt DC/DC low-dropout regulator (LDO regulator) 32 and the 2.8 volt DC/DC low-dropout regulator (LDO regulator) 34. The outputs of these LDO regulators are inputted into the CMOS/LiDAR radar sensor 12, and the output of the CMOS/LiDAR radar sensor 12 is inputted into the microprocessor 20.

The PIR sensor 14 is configured to detect movement of the person and the presence detection sensor is configured to detect the presence of a person in the area and sends the detected information to the microprocessor 20. The microprocessor 20 may use artificial intelligence to perform operations. The microprocessor 20 takes an image every 40 seconds and uses an artificial intelligence/Machine Learning (AI/ML) trained model 61 to identify humans in the vertical position (looking top down). The microprocessor 20 is configured to determine whether or not the area is occupied by the person and the number of persons occupied based on the human presence information and human motion information in the area and sends the occupancy result to the microcontroller 28. For the lighting system, the microcontroller 28 determines the desired light intensity based on the occupancy result received from the microprocessor 20. The current light intensity is determined based on the light intensity information received from the ambient light sensor 18. The microcontroller 28 may communicate with devices wirelessly. When a motion is not detected for a pre-determined interval of 120 seconds, the microcontroller 28 queries the microprocessor 20 over the 12C to check if the human presence count is greater than zero or not. If the count is not greater than zero, then the microcontroller 28 determines that there is no human presence and switches off the elements of the light source or other device. If the human count is greater than zero, the microcontroller 28 then determines that there is a human presence and continues to keep a light source 64 or other devices for the area connected to it in an ON state.

When the area is occupied by one or more persons, the microcontroller 28 sends control commands to the control system 42 to control light sources 64 in the area to adjust the light intensity of the lighting system based on a mapping between the human occupancy data and light intensity in the area. The mapping is performed by the microprocessor 20 based on the number of humans present in the area, position of each human in the area and light intensity in the area. When the area is not occupied by the person, the microcontroller 28 sends control commands to the control system 42 to turn off the lighting system based on the occupancy result received from the microprocessor 20. The microcontroller 28 is specifically used for lighting control. The microcontroller 28 and microprocessor 20 are connected using 12C interface. When the PIR sensor 14 senses motion, it makes the motion sensed information available to the microprocessor 20 via 12C. Similarly, when the CMOS/RF/LiDAR radar sensor 12 identifies the presence of one or more persons, it sends that information to the microprocessor 20.

The microprocessor 20 is operative to determine the number of persons in the area based on the information about the presence of one or more persons in the area from the CMOS/RF/LiDAR radar sensor 12 and the motion information from the PIR sensor 14. The microprocessor 20 is operative to send the information on the number of persons in the area determined by the microprocessor 20 to the microcontroller 28. The microcontroller 28 determines the desired light intensity based on the information on the number of persons in the area received from the microprocessor 20. The ambient light sensor 18 is in operative connection with the microcontroller 28 and is operative to send the light intensity of the area to the microcontroller 28. The microcontroller 28 is operative to send control commands to the control system 42 to control one or more light sources to adjust the light intensity of the area based on the information on the number of persons in the area received from the microprocessor 20 and the light intensity of the area sent by the ambient light sensor 18. The microcontroller 28, which controls lights, uses the human count information to make a decision to switch off the light only when the human count is zero. The microprocessor 20, which identifies and counts people using artificial intelligence (AI) and also controls HVAC, uses the PIR motion sense information from the microcontroller 28 and human count from the microprocessor to turn ON/OFF/adjust set points of HVAC as explained further.

Figure 5:
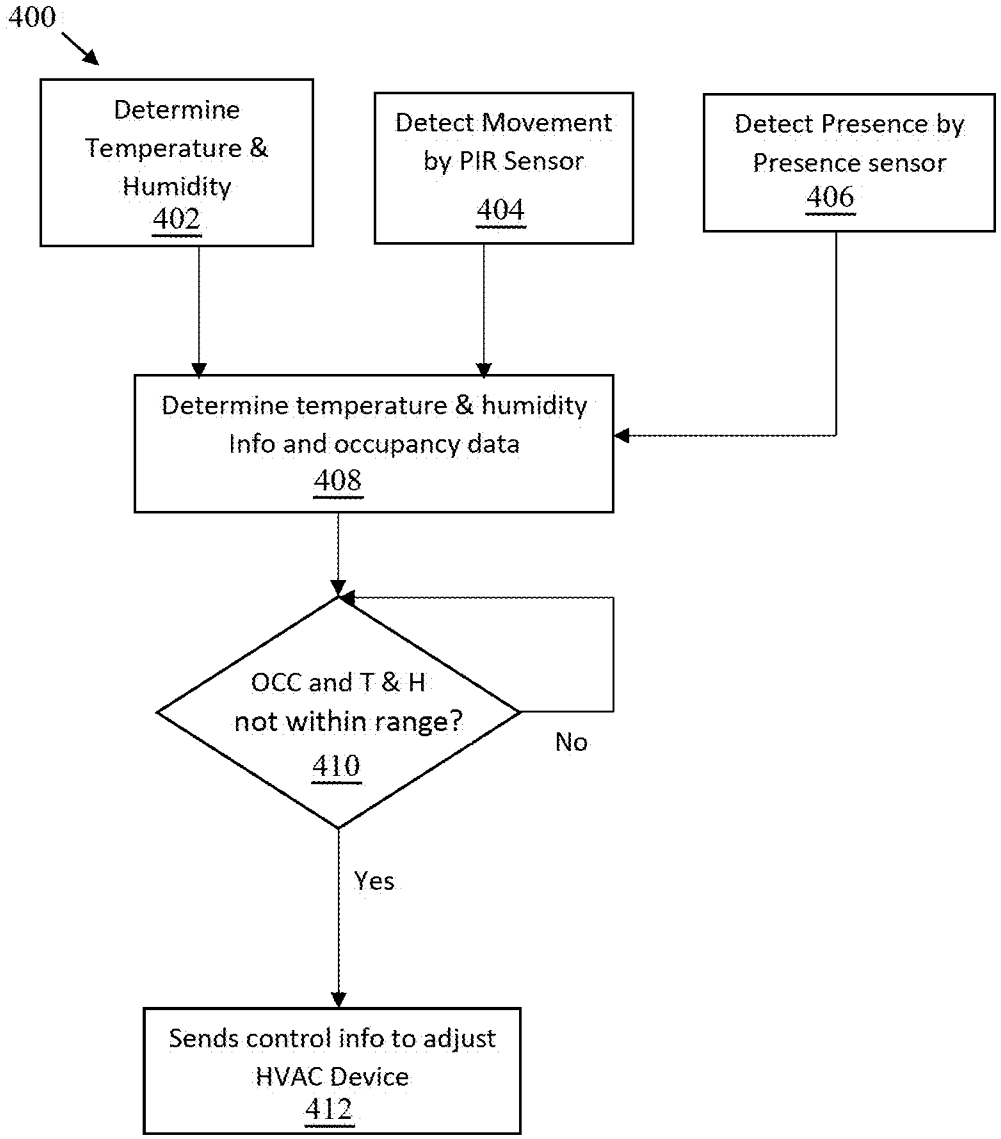
FIG. 5 illustrates a flow diagram of a method of operation of the energy device control apparatus for a HVAC system according to the present invention.

The energy control apparatus 10 can also be used to control a plurality of electronic devices 62 distributed in a plurality of areas or environments (hall, meeting room, cabin, etc.) in a building for automatically adjusting a HVAC system of the area. As illustrated in FIGS. 1 and 5, the temperature and humidity sensor 16 detects the humidity and temperature of the particular environment where the electronic device is located. The microprocessor 20 determines human occupancy data and humidity and temperature information of the area based on receiving the human presence information and humidity and temperature information. The microprocessor 20 also may receive $CO_2$ information from a wireless environmental sensor via Bluetooth wireless and communicate with the cloud management, which controls one or more HVAC devices to control the sending of fresh outside air into the area if the $CO_2$ readings are above a predetermined range.

The microprocessor 20 determines whether the humidity and temperature information of the particular area is not within the predetermined range. If the microprocessor 20 determines that one of more persons are present and the humidity and temperature are not within the predetermined range, the microprocessor 20 sends the humidity and temperature information of the particular area to a controller in the form of a cloud management server 66 that is connected to a plurality of Heating, Ventilation, and Air Conditioning (HVAC) systems, one of which is located in the particular area. The cloud management server 66 sends the control information to HVAC devices to adjust the HVAC system placed in the particular area to the predetermined humidity and temperature range based on the received humidity and temperature information of the particular area from the microprocessor 20. The cloud management server 66 controls one or more HVAC devices in the area based on a mapping between the humidity and temperature information and the human presence information.

Figure 3:
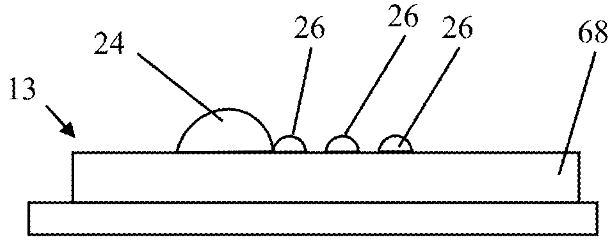
FIG. 3 is a front view of the stand-alone unit of the energy control apparatus of FIG. 1.

As illustrated in FIGS. 2 and 3, the energy control apparatus 10 is a stand-alone unit 13 with one or more of the above-mentioned electric components mounted on a PC board and held together and covered by a casing 68. The push button 24 is provided to turn on the microcontroller 28 upon depressing the push button 24. The LED indicators 26 are provided to indicate the operational status of the apparatus 10. The BACnet and modbus (open protocols) built in the unit 13 control the HVAC system directly from the unit 13 to ensure everything is controlled by the unit 13 directly. Also, the temperature and humidity sensor 16 is integrated into the unit 13 to enable the provision of a PID algorithm mechanism inside the unit 13. The apparatus 10 is also configured to enable the control signals and data to be communicated over a wireless connection.

Figure 4:
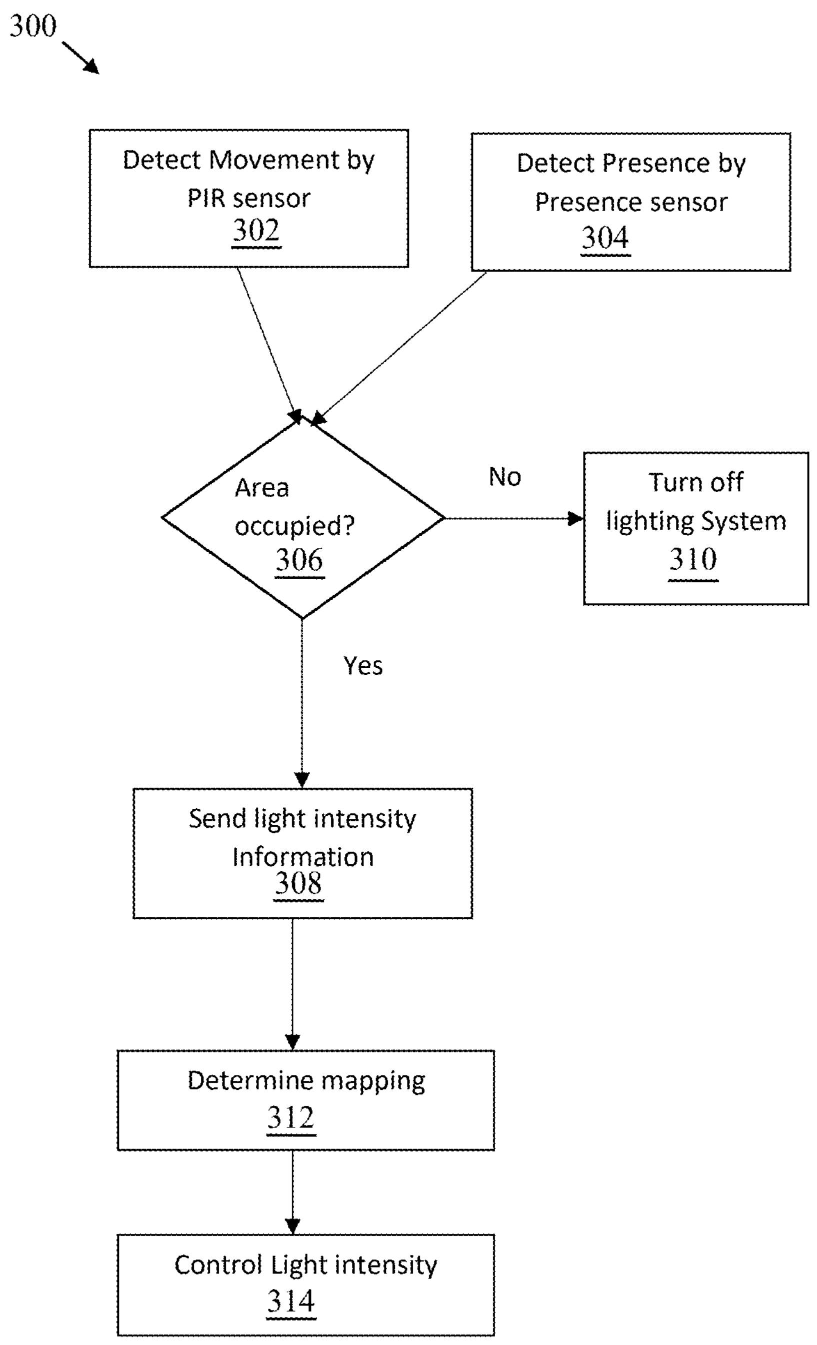
FIG. 4 illustrates a flow diagram of a method of operation of the energy device control apparatus for a light control system according to the present invention.

With reference to FIGS. 4 and 5, example methodologies 300, 400 of operation of the energy device control apparatus are illustrated and described. While each methodology is described as being a series of acts or steps that are performed in a sequence, it is to be understood that the methodology is not limited by the order of the sequence. For instance, some acts or steps may occur in a different order than what is described herein. In addition, a step may occur concurrently with another step. Furthermore, in some instances, not all steps may be required to implement a methodology described herein.

Moreover, the steps or acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodology may be stored in a computer-readable medium, displayed on the display device, and/or the like.

For the lighting control method of operation 300, in step 302, the PIR sensor 14 detects any movement of one or more persons in an area of the building and sends the information to the microprocessor 20. In step 304, the presence sensor 12 detects any presence of one or more persons in the area of the building and sends the information to the microprocessor 20. In step 306, the microprocessor 20 determines whether or not the area is occupied by one or more persons and the number of persons occupying by the area based on the human presence information and human motion information in the area of the building. In step 308, the ambient light sensor 18 sends information of the current light intensity in the area of the building to the microcontroller 28. This step 308 may occur before any of the previous steps. If the microprocessor 20 determines that the area is not occupied by one or more persons, then in step 310, the microcontroller 28 sends control commands to the control system 42 to turn off the lighting system based on the occupancy result received from the microprocessor 20. If the microprocessor 20 determines that the area is occupied by one or more persons, the microcontroller 28 determines a mapping between the human occupancy data and light intensity in the area in step 312. The mapping is performed based on the number of persons present in the area, position of each human in the area and light intensity in the area. Then, in step 314, the microcontroller 28 sends control commands to the control system 42 to have the light sources 64 (FIG. 6) turned on at a light intensity determined by the mapping.

For the HVAC system control method of operation 400, in step 402, the humidity and temperature in the area of the building is determined using the temperature and humidity sensor 16. In step 404, the PIR sensor 14 detects any movement of one or more persons in an area of the building and sends the information to the microprocessor 20. In step 406, the presence sensor 12 detects any presence of the one or more persons in the area of the building and sends the information to the microprocessor 20. In step 408, the microprocessor 20 determines whether or not the area is occupied by the one or more persons and the number of persons occupied by the area based on the presence sensor 12 detecting the presence of the one or more persons in the area and the PIR sensor 14 detecting any movement of the one or more persons in the area of the building. Also, in this step 408, the microprocessor 20 determines the humidity and temperature information of the area sensed by the temperature and humidity sensor 16. Then, in step 410, the microprocessor 20 determines whether the one or more persons are in the particular area and whether the temperature and humidity information of the particular area is at the predetermined range. If the microprocessor 20 determines that the one or more persons are in the particular area and the humidity and temperature information of the particular area is not within the predetermined range, the microprocessor 20 sends the humidity and temperature information of the particular area to the cloud management server 66 that is connected to the plurality of Heating, Ventilation, and Air Conditioning (HVAC), in which one of these HVAC systems is located in the particular area.

Then, in step 412, the cloud management server 66 sends the control information to the one or more HVAC devices 62 of the HVAC system to adjust the temperature and humidity of the particular area to the predetermined temperature and humidity range. The cloud management server 66 controls the one or more HVAC devices 62 in the area based on the mapping between the humidity information and the information about the presence of the one or more person in the area.

The energy control apparatus 10 also has the following features. The DALI standard Lighting control (including Dimming of lights, color changing based on the time-of-the-day) is an independent task and imaging by the CMOS/LiDAR radar sensor 12 is an independent task. When no human presence is detected, images continue to be taken by the CMOS/LiDAR radar sensor 12 to check for human footprints (laptop, bag, jacket, coffee mug etc). That is, the presence sensor 12 continuously operates to sense the presence of the one or more persons in the area regardless of whether the PIR sensor 14 detects motion of the one or more person in the area. Also, the camera integrated with the CMOS/LiDAR radar sensor 12 and PIR sensor 14 are arranged in such a way that they both cover the same area (with 130 degree angle) to ensure the lights are controlled only in that specific area. BACnet and modbus (open protocols) control the HVAC directly in the product to ensure everything is controlled by the product directly. The apparatus is mounted at a minimum of 7.5 feet to a maximum of 11 feet from the ground. The apparatus is mounted in such a way that both the PIR sensor 14 and the CMOS/LiDAR radar sensor 12 are vertically facing the ground. The temperature and humidity sensor 16 being integrated in the apparatus 10 allows the provision of a PID algorithm mechanism inside the apparatus 10 thereby making it an integral system. Also, the apparatus 10 enables the control signals and data to be communicated over a wireless connection. Alternatively, the apparatus 10 may be modified to control non-energy devices for an area of a building or other area by detecting human presence in the area.

Although various embodiments of the disclosed apparatus having energy device control apparatus and method have been shown and described, modifications may occur to those skilled in the art upon reading the specification. The present application includes such modifications and is limited only by the scope of the claims.

What is claimed is:

1. An apparatus for controlling one or more devices for an area of a building comprising:

a presence sensor, wherein the presence sensor is operative to sense the presence of at least one person in the area;

a passive infrared sensor, wherein the passive infrared sensor is operative to detect motion of the at least one person in the area;

a microprocessor;

a controller;

wherein the passive infrared sensor is operative to send motion information to the microprocessor, wherein the presence sensor is operative to send information about the presence of the at least one person in the area to the microprocessor, wherein the microprocessor is operative to determine the number of persons in the area based on the information about the presence of the at least one person in the area from the presence sensor and the motion information from the passive infrared sensor, wherein the microprocessor is operative to send information on the number of persons in the area determined by the microprocessor to the controller, wherein the controller is operative to send control commands to a control system to control the one or more devices based on the information on the number of persons in the area received from the microprocessor, wherein the presence sensor is operative to continuously operate to sense the presence of the at least one person in the area regardless of whether the passive infrared sensor detects motion of the at least one person in the area, wherein, when the passive infrared sensor does not detect motion for a predetermined interval, the controller is operative to query the microprocessor to determine whether the number of persons in the area determined by the microprocessor is greater than zero, and to maintain or turn off operation of the one or more devices based on whether the number of persons in the area determined by the microprocessor is greater than zero.

2. The apparatus of claim 1, further comprising an ambient light sensor, wherein the ambient light sensor is operative to detect the light intensity of the area, wherein the one or more devices comprise one or more light sources for the area, wherein the controller comprises a microcontroller, wherein the microprocessor is operative to send the information on the number of persons in the area determined by the microprocessor to the microcontroller, wherein the microcontroller determines the desired light intensity based on the information on the number of persons in the area received from the microprocessor, wherein the ambient light sensor is operative to send the light intensity of the area to the microcontroller, and wherein the microcontroller is operative to send control commands to the control system to control the one or more light sources to adjust the light intensity of the area based on the information on the number of persons in the area received from the microprocessor and the light intensity of the area sent by the ambient light sensor.

3. The apparatus of claim 2, further comprising a stand-alone unit, wherein the stand-alone unit comprises the presence sensor, the passive infrared sensor, the microprocessor, the ambient light sensor and the microcontroller, and wherein the stand-alone unit is covered by a casing.

4. The apparatus of claim 2, wherein the microcontroller is operative to send control commands to the control system to control the one or more light sources to adjust the light intensity of the area based on a mapping of the information on the number of persons in the area received from the microprocessor, the position of the at least one person in the area, and the light intensity of the area sent by the ambient light sensor.

5. The apparatus of claim 1, wherein the presence sensor comprises a CMOS/LIDR/Radar sensor to sense the presence of the at least one person in the area.

6. The apparatus of claim 1, wherein the microprocessor comprises an artificial intelligence and machine learning trained model to help determine the number of persons in the area based on the information about the presence of the at least one person in the area from the presence sensor and the motion information from the passive infrared sensor.

7. The apparatus of claim 1, further comprising a temperature and humidity sensor for sensing the temperature and humidity of the area, wherein the temperature and humidity sensor is operatively connected to the microprocessor and operative to send the sensed temperature and humidity of the area to the microprocessor, wherein the one or more devices comprise one or more Heating, Ventilation, and Air Conditioning (HVAC) devices, wherein the controller comprises a cloud management server, wherein the microprocessor is operative to send the information on the number of persons in the area determined by the microprocessor to the cloud management server, wherein the microprocessor determines the humidity and temperature information of the area sensed by the temperature and humidity sensor, wherein the microprocessor sends the humidity and temperature information of the area to the cloud management server if the microprocessor determines that the at least one person is in the area and the humidity and temperature information of the area is not within a predetermined range, and wherein the cloud management server sends the control information to the one or more HVAC devices to adjust the humidity and temperature in the area to the predetermined humidity and temperature range.

8. The apparatus of claim 7, wherein the cloud management server is operative to send control commands to control the one or more HVAC devices in the area based on a mapping between the humidity and temperature information and the information about the presence of the at least one person in the area.

9. The apparatus of claim 1, wherein the controller is operative to turn off the one or more devices when, based on information from the presence sensor provided by the microprocessor, the microprocessor determines that the number of persons in the area is not greater than zero.

10. The apparatus of claim 1, wherein the controller is operative to maintain operation of the one or more devices when, based on information from the presence sensor provided by the microprocessor, the microprocessor determines that the number of persons in the area is greater than zero.

11. The apparatus of claim 1, further comprising:

an ambient light sensor, wherein the ambient light sensor is operative to detect the light intensity of the area;

a temperature and humidity sensor for sensing the temperature and humidity of the area; and another controller, wherein the one or more devices comprise one or more light sources for the area, wherein the first mentioned controller comprises a microcontroller, wherein the microprocessor is operative to send the information on the number of persons in the area determined by the microprocessor to the microcontroller, wherein the microcontroller determines a desired light intensity based on the information on the number of persons in the area received from the microprocessor, wherein the ambient light sensor is operative to send the light intensity of the area to the microcontroller, wherein the microcontroller is operative to send control commands to a control system to control the one or more light sources to adjust the light intensity of the area based on the information on the number of persons in the area received from the microprocessor and the light intensity of the area sent by the ambient light sensor, wherein the one or more devices comprise one or more light sources for the area and one or more Heating, Ventilation, and Air Conditioning (HVAC) devices, wherein the another controller comprises a cloud management server, wherein the temperature and humidity sensor is operatively connected to the microprocessor and operative to send the sensed temperature and humidity of the area to the microprocessor, wherein the microprocessor is operative to send the information on the number of persons in the area determined by the microprocessor to the cloud management server, wherein the microprocessor determines the humidity and temperature information of the area sensed by the temperature and humidity sensor, wherein the microprocessor sends the humidity and temperature information of the area to the cloud management server if the microprocessor determines that the at least one person is in the area and the humidity and temperature information of the area is not within the predetermined range, and wherein the cloud management server sends the control information to the one or more HVAC devices to adjust temperature and humidity in the area to a predetermined humidity and temperature range.

12. The apparatus of claim 11, further comprising a stand-alone unit, wherein the stand-alone unit comprises the presence sensor, the passive infrared sensor, the microprocessor, the ambient light sensor, the temperature and humidity sensor and the microcontroller, and wherein the stand-alone unit is covered by a casing.

13. The apparatus of claim 12, wherein the stand-alone unit comprises a push button and light emitting diode indicators, wherein the push button is operative to turn on the microcontroller upon depressing the push button, and wherein the light emitting diode indicators are operative to indicate the operational status of the apparatus.

14. The apparatus of claim 11, wherein the presence sensor comprises a CMOS/LIDR/Radar sensor to sense the presence of the at least one person in the area.

15. The apparatus of claim 11, wherein the microprocessor comprises an artificial intelligence and machine learning trained model to help determine the number of persons in the area based on the information about the presence of the at least one person in the area from the presence sensor and the motion information from the passive infrared sensor.

16. The apparatus of claim 15, wherein the microprocessor is operative to process an image of the area at predetermined intervals in response to receiving information about the presence of the at least one person in the area by the presence sensor.

17. The apparatus of claim 11, wherein the controller is operative to turn off the one or more devices when, based on information from the presence sensor provided by the microprocessor, the microprocessor determines that the number of persons in the area is not greater than zero.

18. The apparatus of claim 11, wherein the controller is operative to maintain operation of the one or more devices when, based on information from the presence sensor provided by the microprocessor, the microprocessor determines that the number of persons in the area is greater than zero.

* * * * *